(12) United States Patent
Cherry et al.

(10) Patent No.: US 10,505,880 B2
(45) Date of Patent: *Dec. 10, 2019

(54) AUTOMATED USER MOBILE DEVICE LOCATION TRACKING AND REMINDERS

(71) Applicant: PUSHD, INC., San Francisco, CA (US)

(72) Inventors: Ben Cherry, San Francisco, CA (US); Abdur Chowdhury, San Francisco, CA (US); Ophir Frieder, Chevy Chase, MD (US); Eric Jensen, Brooklyn, NY (US); Matt Sanford, Seattle, WA (US)

(73) Assignee: PUSHD, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/104,008

(22) Filed: Aug. 16, 2018

(65) Prior Publication Data

US 2018/0359599 A1 Dec. 13, 2018

Related U.S. Application Data

(63) Continuation of application No. 14/989,486, filed on Jan. 6, 2016, now Pat. No. 10,063,999, which is a
(Continued)

(51) Int. Cl.
*H04L 12/58* (2006.01)
*H04W 64/00* (2009.01)
(Continued)

(52) U.S. Cl.
CPC .............. *H04L 51/20* (2013.01); *H04L 51/38* (2013.01); *H04W 4/029* (2018.02); *H04W 4/12* (2013.01);
(Continued)

(58) Field of Classification Search
CPC ......... H04L 51/20; H04L 51/38; H04L 51/32; H04W 4/029; H04W 52/0258;
(Continued)

(56) References Cited

U.S. PATENT DOCUMENTS 8,633,853 B2  1/2014 Amidi
9,225,789 B2 12/2015 Jensen et al.
(Continued)

OTHER PUBLICATIONS

Hazas, M., et al., "Location-Aware Computing Comes of Age," Invisible Computing, Feb. 2004, pp. 95-97.
(Continued)

*Primary Examiner* — Michael A Keller
(74) *Attorney, Agent, or Firm* — Pauley Erickson & Kottis

(57) ABSTRACT

A method, system, and/or apparatus for automatically tracking and sending electronic reminder messages to a mobile user using the user's mobile device as a function of the user's tracked location. This invention is particularly useful in the field of social media, such as for detecting and tracking the location of a user and her community for actuating reminders based upon the user's location and/or the location of members of the community. The method or implementing software application uses or relies upon location information available on the mobile device from any source, such as GPS, cell phone usage, WiFi triangulation, and/or other device applications.

20 Claims, 7 Drawing Sheets

Related U.S. Application Data continuation of application No. 14/270,534, filed on May 6, 2014, now Pat. No. 9,288,616, which is a continuation-in-part of application No. 14/051,071, filed on Oct. 10, 2013, now Pat. No. 9,225,789, and a continuation-in-part of application No. 14/051,089, filed on Oct. 10, 2013, now Pat. No. 9,338,759.

(51) Int. Cl.
 *H04W 4/029* (2018.01)
 *H04W 4/12* (2009.01)
 *H04W 52/02* (2009.01)

(52) U.S. Cl.
 CPC ....... *H04W 52/0258* (2013.01); *H04W 64/00* (2013.01); *H04L 51/32* (2013.01); *Y02D 70/142* (2018.01); *Y02D 70/144* (2018.01); *Y02D 70/164* (2018.01)

(58) Field of Classification Search
 CPC ...... H04W 4/12; H04W 64/00; Y02D 70/144; Y02D 70/142; Y02D 70/164
 See application file for complete search history.

(56) References Cited

U.S. PATENT DOCUMENTS

| | | | |
|---|---|---|---|
| 9,288,616 B2 | 3/2016 | Cherry et al. | |
| 9,338,759 B2 | 5/2016 | Chowdhury et al. | |
| 9,386,052 B2 | 7/2016 | Chowdhury et al. | |
| 2007/0282621 A1* | 12/2007 | Altman | G06Q 10/10 705/319 |
| 2009/0240586 A1 | 9/2009 | Ramer et al. | |
| 2010/0082398 A1 | 4/2010 | Davis et al. | |
| 2010/0130233 A1 | 5/2010 | Parker | |
| 2010/0280904 A1 | 11/2010 | Ahuja | |
| 2010/0332324 A1 | 12/2010 | Khosravy et al. | |
| 2011/0029359 A1 | 2/2011 | Roeding et al. | |
| 2011/0029370 A1 | 2/2011 | Roeding et al. | |
| 2011/0161427 A1 | 6/2011 | Fortin et al. | |
| 2011/0178863 A1 | 7/2011 | Daigle | |
| 2011/0179064 A1 | 7/2011 | Russo | |
| 2012/0047129 A1 | 2/2012 | Redstone et al. | |
| 2012/0089679 A1 | 4/2012 | Gold | |
| 2012/0158845 A1 | 6/2012 | Baalu et al. | |
| 2012/0179563 A1 | 7/2012 | Soroca et al. | |
| 2012/0215637 A1 | 8/2012 | Hermann | |
| 2012/0265841 A1 | 10/2012 | Ross et al. | |
| 2012/0278387 A1 | 11/2012 | Garcia et al. | |
| 2012/0290389 A1 | 11/2012 | Greenough et al. | |
| 2012/0302258 A1 | 11/2012 | Pal et al. | |
| 2012/0309376 A1* | 12/2012 | Huang | H04M 1/72572 455/418 |
| 2012/0316963 A1* | 12/2012 | Moshfeghi | G06Q 20/20 705/14.58 |
| 2013/0060640 A1 | 3/2013 | Gadhia et al. | |
| 2013/0066964 A1 | 3/2013 | Odio et al. | |
| 2013/0073622 A1 | 3/2013 | Nguyen et al. | |
| 2013/0085861 A1 | 4/2013 | Dunlap | |
| 2013/0103757 A1 | 4/2013 | Mitchell et al. | |
| 2013/0117109 A1 | 5/2013 | Busch | |
| 2013/0166386 A1 | 6/2013 | Simmons | |
| 2013/0191215 A1 | 6/2013 | Metcalf | |
| 2013/0303106 A1 | 11/2013 | Martin | |
| 2014/0333432 A1 | 11/2014 | Armitage | |
| 2015/0106449 A1 | 4/2015 | Cherry et al. | |
| 2015/0373493 A1 | 12/2015 | Chowdhury et al. | |
| 2016/0066864 A1 | 3/2016 | Frieder et al. | |
| 2016/0140934 A1 | 5/2016 | Frieder et al. | |
| 2016/0183048 A1 | 6/2016 | Cherry et al. | |
| 2016/0255162 A1 | 9/2016 | Frieder et al. | |

OTHER PUBLICATIONS

Chen, G., et al., "A Survey of Context-Aware Mobile Computing Research," Dartmouth Computer Science Technical Report TR2000-381, (2000), 16 pages.

Bahl, P., et al., "RADAR: An In-Building RF-based User Location and Tracking System," IEEE INFOCOM (2000), vol. 2, pp. 775-784.

Kennedy, M., et al., "Adaptive Energy Optimization in Multimedia-centric Wireless Devices: A Survey," IEEE Communication Surveys and Tutorials (COMST), (2012), 19 pages.

Wang, C., et al., "Simultaneous Localization, Mapping and Moving Object Tracking," International Journal of Robotics Research (2004), 47 pages.

Krumm, J., et al., "LOCADIO: Inferring Motion and Location from Wi-Fi Signal Strengths," MOBIQUITOUS Conference, Boston, MA, Aug. 22-26, 2004, pp. 4-13.

Perrucci, G. P., et al., "On the Impact of 2G and 3G Network Usage for Mobile Phones' Battery Life," European Wireless Conference, May 17-20, 2009, pp. 255-259.

\* cited by examiner

AUTOMATED USER MOBILE DEVICE LOCATION TRACKING AND REMINDERS

CROSS REFERENCE TO RELATED APPLICATIONS

This application is a continuation of U.S. patent application Ser. No. 14/989,486, filed on 6 Jan. 2016, which is a continuation of U.S. patent application Ser. No. 14/270,534, filed on 6 May 2014, which is a continuation-in-part of each of: U.S. patent application Ser. No. 14/051,071, filed on 10 Oct. 2013, and U.S. patent application Ser. No. 14/051,089, filed on 10 Oct. 2013. The co-pending parent applications are hereby incorporated by reference herein in their entirety and are made a part hereof, including but not limited to those portions which specifically appear hereinafter.

FIELD OF THE INVENTION

This invention relates generally to a method, system, and/or apparatus that automatically tracks a mobile user and automatically sends messages based upon a proximity to a location or person, all using the user's mobile device. This invention is particularly useful in the field of social media, such as for detecting and/or tracking the location and activity of mobile users.

BACKGROUND OF THE INVENTION

Mobile devices and social media systems have permeated daily life. Information is collected, organized, and disseminated worldwide via informational collection and dissemination, micro-blogging and blogging services. Other social media are mobile and positional in nature and can be referred to as Mobile Positional Social Media (MPSM). As these systems focus on locations, mobile device implementations permeate the space. That said, however, while MPSM implementations are targeted to primarily execute on mobile devices, such as but not limited to smart-phones (e.g., Apple's iPhone, Google's Android), tablets (e.g., Apple's iPad, HP TouchPad), and laptop computers, they often support implementations for non-mobile environments such as but not limited to desktops and workstations, and large scale compute farms and cloud computing servers.

One limitation of MPSM systems is their reliance on global positioning systems (GPS). The use of GPS devices does typically simplify location tracking implementation; however, this comes at a significant energy cost. Since a significant portion of MPSM systems usage is via mobile devices, reducing energy consumption is critical.

There is therefore a continuing need for improved MPSM systems and applications, including energy saving location methods and systems, which can expand uses for MPSM and/or mobile devices.

SUMMARY OF THE INVENTION

This invention provides a method, system, and apparatus, such as embodied in an MPSM or other software application, which creates, delivers, and displays an electronic message, such as a reminder note message, at a relevant position. The invention functions by desirably automatically tracking a mobile user using the user's mobile device(s), and also tracking the user's social media community through their corresponding devices.

One embodiment of the invention provides a method, executed by a computer system, of delivering messages. The method includes receiving an electronic message, e.g., including text and/or an image, created by a user through an electronic device, storing the electronic message, automatically determining when the electronic device is at an actuating position, and automatically posting the electronic message upon determining the electronic device is at the actuating position. The actuating position can be any suitable location-based position, such as, without limitation, a proximity to a location or to a second electronic device. The electronic message can be linked to the actuating position, and delivered by, for example, short message service, e-mail, and/or a common wireless connection to the user and/or to a member of the user's community.

The electronic message can be delivered to the user herself/himself on her/his mobile device (e.g., the message creating device or another mobile device of the user) or to another person's device. In one embodiment of this invention, the method of delivering messages includes receiving an electronic message from a user through a first electronic device of the user, automatically linking the electronic message to a message recipient, automatically determining that the user is within a predetermined proximity to the recipient, and automatically posting the electronic message to a second electronic device of the recipient upon determining that the first electronic device is within the predetermined proximity. The message can be delivered by short message service, e-mail, or a common wireless connection such as Bluetooth.

Ideally, mobile devices and MPSM systems should avoid reliance on GPS devices due to the energy expense. Embodiments of this invention can incorporate a location method that relies on location information available on or through the mobile device regardless of how or why obtained. For example, general use of telephone features and/or other applications of the mobile device can provide location transmission or other location data for use in this invention. By using the location transmissions, embodiments of this invention can track and update locations without the reliance on GPS. Particular embodiments of this invention provide one or more additional location functionalities including, without limitation, automatically identifying locations based on one or more distances from previously identified user or community locations, automatically identifying when the user is in transit and at what rate, automatically identifying when a user has arrived at the desired destination, automatically identifying locations based on time and location of known activities, automatically refining location positioning based on time and location of known activities, automatically identifying locations based on routines, and/or automatically refining locations positioning based on routines.

The method and system of this invention are particularly useful in social media applications. The method and system of this invention can be used to automatically determine and share a location and/or an activity of a user in an MPSM system. The method and system of this invention can allow for automating previously manually user-controlled MPSM.

Other objects and advantages will be apparent to those skilled in the art from the following detailed description taken in conjunction with the appended claims and drawings.

DETAILED DESCRIPTION OF THE INVENTION

Figure 1:
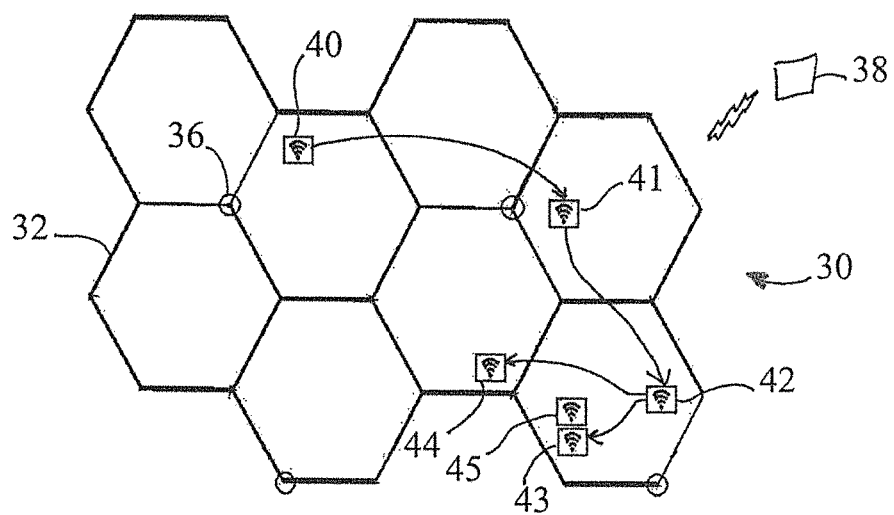
FIG. 1 shows a representative area of a user of one embodiment of this invention.

This invention includes a method, system, and/or apparatus, such as embodied in an MPSM or other software application, which automatically tracks a location of a user and automatically delivers reminders or other messages based upon determined locations. The invention can incorporate any suitable tracking functionality, such as GPS and/or cell phone location methods, and desirably incorporates energy saving location methods for the mobile device that can be used to more efficiently allow the location and social media aspects of the invention to be implemented on a mobile device. The method and application is used for automated reminders, and is particularly useful for use in social media applications. The invention will be described below with implementation in an MPSM system, and particularly with an MPSM application that determines and/or monitors user locations and/or context.

The method and system of this invention is mobile and positional in nature. Such systems, like many other systems originally developed on one type of computing platform but migrated to another, operate not only on mobile environments. That is, while MPSM implementations are targeted to primarily execute on mobile devices, such as but not limited to smart-phones, tablets, and/or laptops, they often support implementation for non-mobile environments such as but not limited to desktops and workstations, servers, and large scale compute farms and cloud computing servers. The invention will be described below with a mobile device, such as smart phone having cell service, a GPS system, and access to the Internet via WiFi.

The invention includes a system and method for delivering messages linked to, or otherwise based upon proximity to, a location or other actuating position. The electronic message can be any message, but is preferably a type of electronic reminder note that a user at one location links to an actuating position which is at a different, remote location. The actuating position can be, for example, a physical location, such as a store or an office, or a proximity to another user. The user is reminded and/or notified of events, numbers, activities, or any other mentionable items upon arrival at a location or upon encountering a targeted individual. The reminder message is delivered via the user's or other recipient's mobile device.

As an example, if the user had established a self-reminder to buy apples, then the device can determine from monitoring the user's location when the user is in proximity to a market or other store that likely sells apples. The user may be at the market or sufficiently close to a market that the user may intend to or want to shop. If the user receives a reminder, but cannot complete the reminder at that time (such as not having time to enter the market), then the user can simply ignore or actively reengage the reminder to remain stored and active for the next opportunity.

In embodiments of this invention, an electronic message is created in an electronic device, and stored in the electronic device or a remote server, etc. A future triggering event causes the message to be delivered to the intended recipient. The recipient can be the user herself, and/or one or more other person, such as persons in the user's pre-established community. In preferred embodiments of this invention, the triggering event is the proximity of the user to an actuating position, such as a particular destination or encountering a fellow user within the user's community. Actuating positions can be a physical location, such as but not limited to a particular address, a logical address, such as but not limited to for example, the user's work address, proximity to a location such as, but not limited to, 500 meters from either a physical or logical address, and/or proximity to one or more users within the user's community. The location can be a specific location, such as ABC Hardware, and/or a general type of location, such as any hardware store. Encountering a fellow user within the user's community can occur either when both members are near or at a preset destination—physical, logical, or proximity—or within a transmission distance to one another independent of the identification of their physical location.

The electronic message of this invention can be a single message or a sequence of messages, pictures, photographs, video clips, animations, sound waves, or combinations thereof. These electronic reminder notes can either be plain or optionally have a background consisting of a pattern, color, animation, sound, or a combination thereof that is either chosen by the user or is set as default. Textual messages can be of varied fonts or sizes; pictures can either be imported or drawn or modified on the mobile device; photographs can be imported, modified on, or taken by the mobile device; videos can be imported, modified on or taken by the mobile device; animations can be imported, modified on or produced on the mobile device; and sound waves can be imported, produced or modified on the mobile device, or a combination thereof. The production or modification of text messages, pictures, photographs, videos, animations, and sound waves is accomplished by any of the known approaches in the art including but limited to the use and manipulation of clip art, enhanced photo enhancement, and voice dictation.

Upon creation of the electronic message, the message is stored until deletion or delivery upon reaching the actuating position. The electronic messages can be stored throughout their lifetime, which includes, but is not limited to, before and after they are posted. A history of the postings generated, received, and/or transmitted can be maintained for each user. Such storage can be accomplished via any of the known storage structures and mediums discussed or known in the art. Such structures include but are not limited to file structures, database management systems, and data warehouses.

Electronic reminder messages can be stored locally on the mobile device, on a remote backend storage server, or on both. If multiple copies are stored, synchronization between remote server and mobile device can be maintain using any of the known approaches in the art and can be updated whenever a change of status occurs or at any given time interval. A change of status can be caused by any change identified by the mobile device including but not limited to level of energy, level or type of activity, or location.

During creation, the electronic message is desirably linked to an actuating position, either proximity to a community user or to a location. Upon encountering the actuating position, the electronic reminder note is posted. If the note serves as a personal reminder, then a notification on the local device appears. If the note is intended for a user's community member, then the note must be sent to a different device.

If the message is to be sent to one or more community members and is stored locally, it can be sent from the mobile device via a text (SMS) or an e-mail message to the targeted community member's device. Similarly, if the two devices are within the range and allowed access of a common local network, such as but not limited to Bluetooth, then that local network can be used for device detection and/or message delivery. If the note is stored remotely, then the user's mobile device issues a request to the remote server, and the remote server sends a text (SMS) or an e-mail message, etc., containing the specific note to the targeted community member's device when the server receives notice that the recipient is at the actuating position.

The method and system of this invention is desirably executed or implemented on a mobile device computing platform. Such computing platforms generally include a processor, a recordable medium, an input/output (I/O) device, and a network interface capable of connecting either directly or indirectly to the Internet. The mobile device executes over a networked environment, such as the non-limiting example shown in FIG. 1. The mobile device is connected, either directly or indirectly, using any of the many techniques and technologies known in the art, over a network, to back-end system or systems, itself/themselves computing devices. The mobile device can connect with a remote server, shown in FIG. 1 as server 38, to store and/or access user or community information.

MPSM systems are used to support users remaining socially aware of their community. That is, their primary usage typically is to actively monitor the location and activity of family members, friends, colleagues, and generally others within one's community. Communities can be partitioned into sub-communities where the union of the sub-communities forms the user's community. The sub-communities may or may not overlap. The partitioning of communities into sub-communities is beneficial in supporting specialized applications.

The creation of a community can involve the issuing of invitations. An invitation is a request by a user A of another user B to allow the inviting user, user A, to track the activities of the invited user, user B, and vice versa. If the invited user accepts, the inviting and invited users form a community.

A community is relevant to only that user which formed it. That is, different users have different communities. A community is a grouping of invited (referred to as remote) users by the inviting (referred to as local) user. A local user can partition or merge a community, thus forming a sub-community or a parent community, respectively. For example, consider 5 users: Bob, Sam, Sally, Alice, and Susan. Bob can invite Sam, Sally, and Alice, thus forming his user community. Bob can likewise partition his community into a sub-community consisting of only Sam and Sally. Sally can invite Susan. Thus, Sally's community would include Bob (via his invitation) as well as Susan. If no additional invites occurred, Sam's and Alice's respective communities would only include Bob (each via Bob's invitation), while Susan's community would only include Sally (via Sally's invitation).

Users are identified by their account identifier. To use MPSM a user account is created. User accounts generally require a user login, which is a unique user identifier, and a password or equivalent. After having created an account, a user can log in. Initially, the local user does not have a community. In embodiments of this invention, over time, the method and application tracks the activities and location of the local user. Should the local user establish a community as aforementioned described, the community members will likewise be tracked. Local users receive notifications of the location and activities of their community members. Once logged in, the local user can select to activate or deactivate self and community tracking and notification. If not overwritten, default settings are used. Whenever logged in and tracking is enabled, a user's location is tracked.

Providing users with the opportunity to expand their communities in a convenient manner is advantageous. Such expansion can seamlessly be accommodated by including users listed in a user's contact lists either as a whole or selectively into their community. Contact lists include, but are not limited to, users listed in a user's local address book, e-mail contact list, Twitter follow list, LinkedIn connections list, and/or Facebook friends list. By incorporating users listed in a user's contact list, the user's community is expanded without effort. Note, however, that selected inclusion can be supported; thus enabling community growth without unnecessarily over-expanding the community. That is, entries from the contact list can be included in their entirety and the user can selectively remove those entries which s/he wishes to be excluded from the community. Similarly, entries from the contact list can be selectively added.

Figure 2:
FIG. 2 illustrates the selection of a target community member for delivering a message on a mobile device according to one embodiment of this invention.

FIGS. 2-5 are screen shots of an application for creating electronic messages on a mobile device for sending to another person, according to embodiments of this invention. An electronic message is first created by selecting a community member as the target recipient or set of target recipients of the electronic message. FIG. 2 shows a community contact list for a user. The first 10 community members are shown in an alphabetical ordering; however, they can likewise be grouped by, but not limited to: sub-communities, reverse alphabetical order, chronological age of the members, or any other ordering. Note also, that each contact has a photograph icon that can be substituted with a photograph or other image.

Figure 3:
FIG. 3 illustrates the titling of the electronic reminder message targeted for a particular community member, according to one embodiment of this invention.
Figure 4:
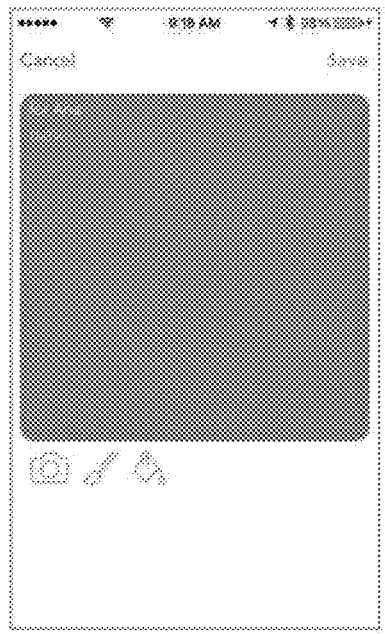
FIG. 4 illustrates the selection of a background for the electronic reminder message according to one embodiment of this invention.
Figure 5:
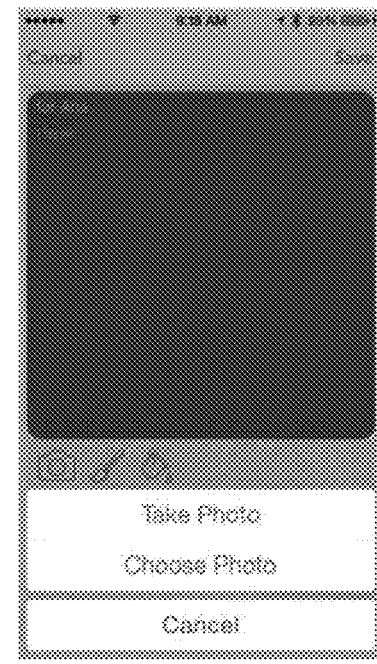
FIG. 5 illustrates providing an option to select or take a photograph for the electronic message according to one embodiment of this invention.

In FIG. 3, a target community member is selected, in this case, Ana. Having selected a community member, a title for the electronic reminder message is entered. As shown, a keyboard display is presented, and a title can be entered. The message can be modifiable with any desirable features. For example, a colored background can be selected, such as shown in FIG. 4. Other background options can exist, for example but not limited to blue, the option to insert a photograph as shown in FIG. 5. Options to select from previously obtained photographs or to take a photograph as background are illustrated. The user can opt to return to the previous electronic reminder note processing stage by canceling the current request.

Figure 6:
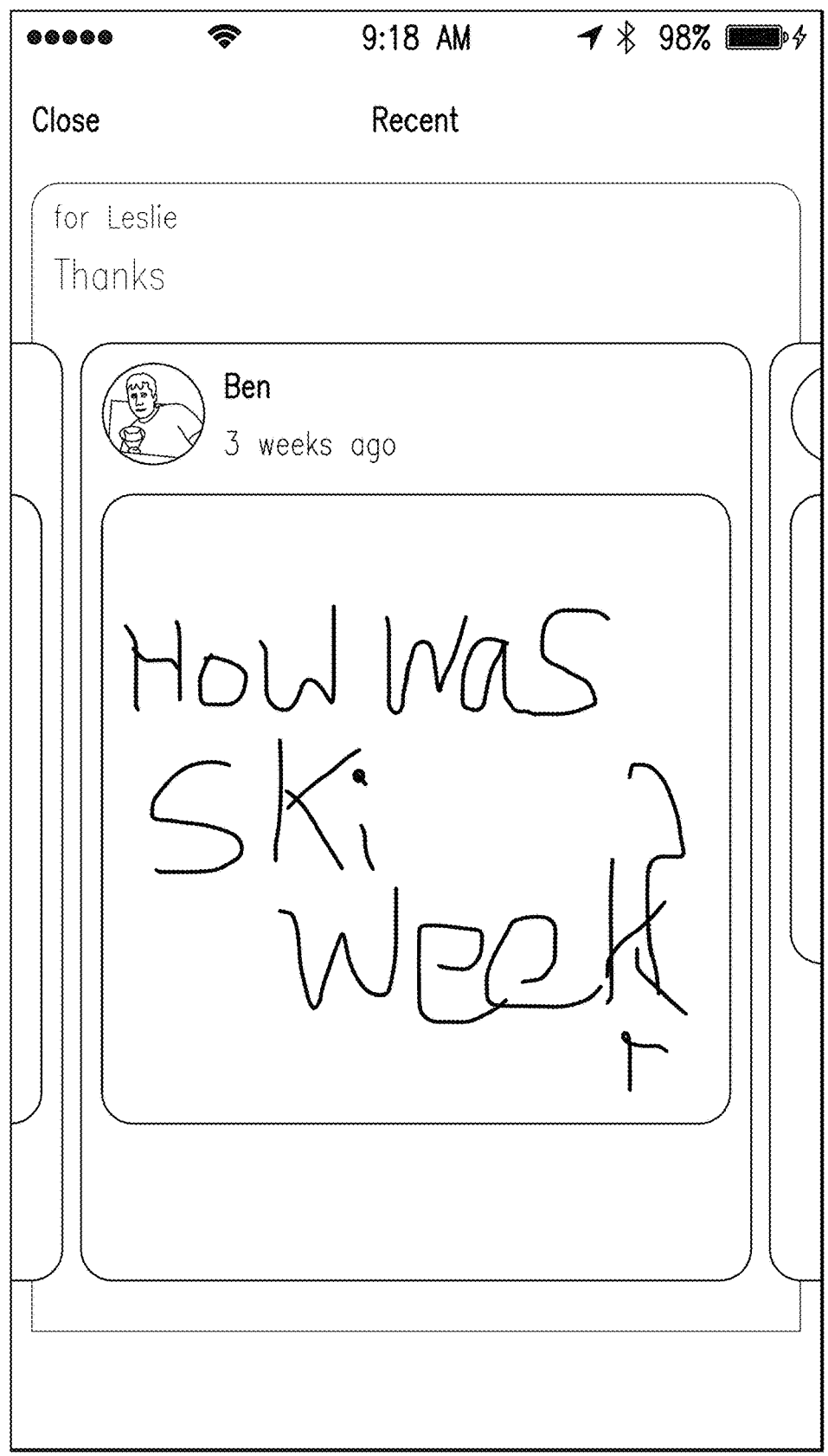
FIG. 6 illustrates an electronic reminder message with a color background and a handwritten note according to one embodiment of this invention.
Figure 7:
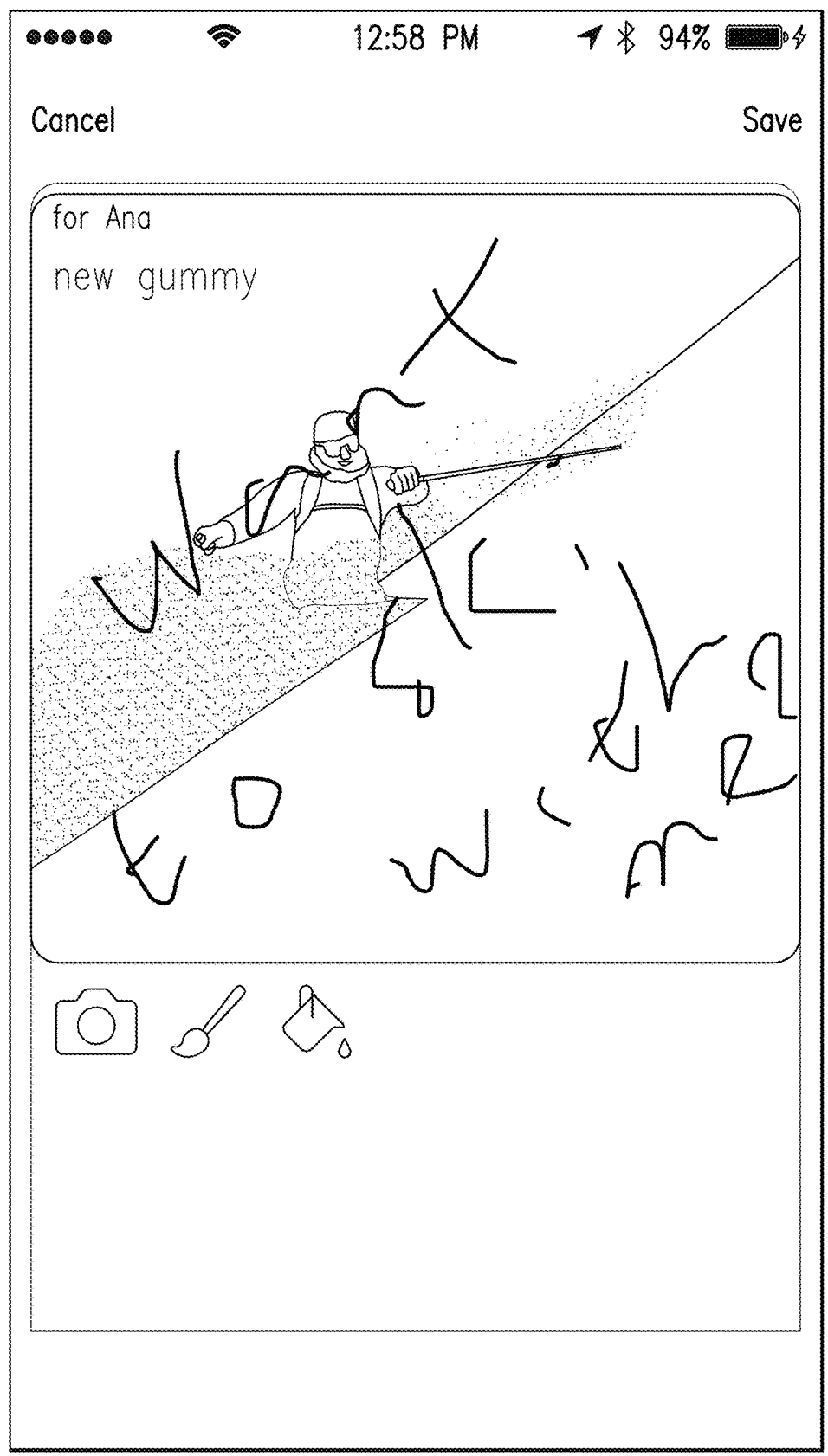
FIG. 7 illustrates an electronic reminder note with a photograph background and a handwritten note according to one embodiment of this invention.
Figure 8:
FIG. 8 illustrates an electronic reminder message with a photograph background and a typed note according to one embodiment of this invention.

The message can be created by typing text, as shown in FIG. 3, or can also be formed or annotated via handwriting. In the message of FIG. 6, for example, Ben thanks Leslie in a typed message space and additionally uses a solid colored background to inquire about her ski week by a handwritten electronic note. Handwritten annotation can likewise be recorded using a photograph background, as shown in FIG. 7. Similarly, annotation can be type written on an electronic reminder note without a background, with a color background, or using a photograph background, such as shown in FIG. 8.

In one embodiment of this invention, a user's created message is linked to a location or a person and stored until the user, along with one of the user's mobile devices, is with a predetermined proximity to the location or an electronic device of the intended recipient. The user's mobile device desirably automatically determines when the device is within the proximity to the location and/or the person and, upon such a determination posts the stored message to the intended recipient.

Various and alternative methods are available for the device to determine when it is within proximity to one or more locations or third party recipients. Device functionalities such as GPS can be utilized, but reliance on GPS can undesirably drain device battery. In one embodiment, the device incorporates a method of determining the proximity using a combination of phone functionalities, such as discussed further below.

FIG. 1 illustrates a representative area 30 to demonstrate a method of, and application for, locations and/or activities of a user participating in a social networking service. The area 30 is shown as a cellular communication network including a plurality of cells 32 each disposed around a cellular communication antennae or base station 36. Within the area are a plurality of destinations 40-45 each shown as including a WiFi Internet connection. The local user has one or more electronic devices, such as a mobile device that communicates with a remote server 38 via the cellular network and/or the WiFi connections. As will be appreciated the methods and applications of this invention can operate within any suitable size and configuration of the communication area, depending on what the user encounters.

In embodiments of this invention, at each destination 40-45, the mobile device determines the location, nearby locations, and/or any proximity to a community member. The device can use or rely upon cell coordinates. When mobile devices communicate with a cell tower, they send their cell coordinates. These coordinates are recorded by the cell provider and are typically not publicly known. The cell phone or, in this case, the mobile device supporting the positional social media system, however, is aware of their coordinates. Thus, the device can determine the cell coordinate position and automatically determine from the cell coordinate a location and a proximity to any location linked to any stored message.

As an example, referring to FIG. 1, destination 40 is the home of the user. The user commutes to office 42 for work on most business days. On the way the user typically stops at the coffee shop 41. For lunch on most days, the user visits restaurant 43, but on Wednesdays the user typically meets a second user for lunch at restaurant 44. While at home 40 on a Sunday, the user enters several reminders; one for each of destinations 41, 42, and 43. On Monday, while stopping at coffee shop 41, the user automatically receives his Sunday message to buy a bag of beans in addition to his cup of coffee. At his office 42, he receives a message when passing the desk of a coworker to remind the coworker about an idea he had for a project (the message could have alternatively or additionally be delivered to the coworker as well, if desired). On Wednesday, a Sunday message for the second user, which is or includes a photograph of mutual interest, is delivered to the second user's phone upon meeting for lunch.

As will be appreciated, various and alternative messages can be created and delivered using the method and system in the above scenario. In an embodiment of this invention, community users can set up messages linked to one or more locations for other users. For example, referring to FIG. 1, the user's spouse could set with her device an automated reminder on Sunday for the user to buy the coffee beans, and to be delivered upon the user reaching the shop 41. As another example, a friend can create a reminder on the friend's device for the user to try the sea urchin and quail egg when the user arrives at restaurant 43. In addition, a shared list, such as a grocery or party planning list, can be set for the user and his spouse and/or friends so that whoever arrives at a market first receives the reminder. The reminder can be indicated as acted upon when completed so the other person doesn't duplicate the purchase.

In one embodiment of this invention, the method can also operate with persons not within the user's community. The method can operate by common identifiers such as telephone numbers, e-mail addresses, or other social media identifiers. For example, the user enters a conversation with a non-community acquaintance and discovers the acquaintance is soon traveling to Chicago. The user can tell of a favorite restaurant and set up a reminder for the acquaintance based upon the acquaintance's telephone number, social media identifier, etc., without the acquaintance needing to be added to the user's closely kept community. The acquaintance can receive the restaurant reminder in any desired format upon the system determining or receiving notice of the acquaintance arriving at Chicago.

In another embodiment of this invention, the reminder can be automatically set by a 'smart' appliance or software application having been given access to the user's system account. For example, a WiFi-connected furnace or refrigerator could automatically create a reminder to buy filters at a hardware store. Alternatively, the smart appliance could send the user a real-time message to perform maintenance, and the message could contain or otherwise be linked to an option to remind the user to buy parts when at the hardware store, according to the method and system of this invention.

The system and method of this invention monitors the locations of the user and the user's community. In one embodiment of this invention, each community member's device is determining the corresponding user's location. The devices can communicate the location information to a central server which determines when two or more users are within the predetermined proximity. If a user has a message stored for delivery to another user, and these two users are determined to be in proximity, then the stored message can be sent to the recipient. As will be appreciated, any of various methods for determining location and proximity to another device can be incorporated by this invention. For example, two devices can determine proximity by a common wireless connection, such as Bluetooth or other communication platform.

In one embodiment, an additional and/or alternative approach for automatic location determination relies on WiFi triangulations. Mobile devices can grow and maintain a database of known open WiFi networks, for clarity we call this database an Open-WiFi-Net database. Such mobile devices can use the information stored or derived from the information stored in the Open-WiFi-Net database to further refine the accuracy of a location without the use of GPS. Via point triangulation, when an Open-WiFi-Net database is available, the mobile operating system uses not only the cell tower but also WiFi triangulations to determine location. It is within the scope of this invention to use either or both cell-phone and WiFi triangulations to enhance location information in addition to any other disclosed approach. The mobile device can use the WiFi signal at a destination, such as destination 43, and additionally or alternatively any detectable open WiFi signal from a neighboring location, such as establishment 45 that is adjacent destination 43. In one embodiment, if the WIFI signal indicates the name and/or type of location, such as ABC Hardware, then a corresponding reminder for that location can be triggered by that information.

Having created the location database, searching, namely querying, the database uses the cell coordinate or the location name. That is, a location name query takes a location name as input and returns the corresponding cell coordinate. A cell coordinate query takes a location name as input and returns the corresponding location name. Note that, multiple names can be attributed to a given cell coordinate. That is, a local user might name a location using multiple different names; different users can name same locations using different names. Similarly, the same name can be used for different cell coordinate locations. All names corresponding to a given cell coordinate are returned. It is within the scope of this invention to selectively return names based on context, user, or community bias. Similarly, all cell coordinates corresponding to a given name are returned. Again, it is within the scope of this invention to selectively return coordinates based on context, user, or community bias. Ranking of the results returned can, when desired, be biased towards the local user.

A key concern for MPSM systems is collecting location information. Clearly any location information available within the mobile device should be harnessed. Thus, if GPS readings or any other location information is generated by other device resident applications, these readings are desirably recorded and utilized by the method and application of this invention. However, reliance on strictly other applications to obtain positional information is obviously not realistic or possible.

In embodiments of this invention, positional information is obtained via the use of geofences. A geofence is geographical boundary or "fence" surrounding a positional reading. As these boundaries are radius based, geofences are generally circular. Location transmission occurs whenever a handover of one cell tower to another occurs and is expected but not guaranteed to occur once a geofence boundary is crossed. To track location, periodic location transmissions are required. Since location transmissions must be minimized to conserve device energy, transmissions should only occur given geographical movement. Thus, crossing a geofence should generate such a transmission. Unfortunately, as crossing a geofence does not guarantee a location transmission, increasing the likelihood of a transmission is necessary.

In contrast to the known uses that surround a location with a single geofence, to increase the likelihood of a location transmission during movement, embodiments of this invention include surrounding a location geofence with a plurality of geofences. In one embodiment of this invention, a method of tracking a user includes determining a location of the mobile user, automatically establishing a first geofence around the location, and automatically establishing a plurality of additional geofences around the first geofence, with each geofence including a boundary. A location transmission is obtained by the mobile device upon crossing a boundary of the first geofence or any of the plurality of additional geofences. Multiple neighboring geofences are advantageous since they increase the likelihood of a location transmission as their boundaries are likewise likely to be crossed given movement.

Figure 9:
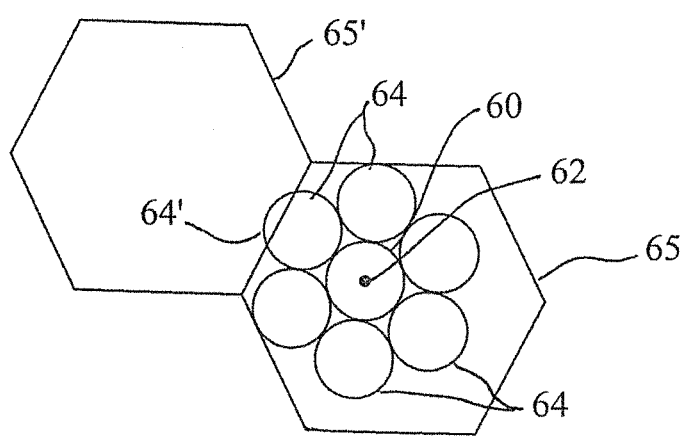
FIG. 9 illustrates geofences surrounding a current reading and its immediate neighbors according to one embodiment of this invention.

FIG. 9 representatively illustrates a geofence 60 surrounding a current location 62. The geofence 60 is surrounded by additional geofences 64, all within a given cellular tower transmissions cell 65. Note that part of a neighboring geofence 64' is not fully within the cell 65, and hence, limits its benefits since a cell tower handoff by movement into cell 65' will generate a location transmission.

Geofences are implemented as software processes. Operating systems for mobile devices, such as but not limited to iOS and Android, limit the number of processes available to an application, and thus, the number of geofences is bounded. However, this limit typically exceeds the number of geofences generated using the approach described above. Therefore, additional processes are available, and hence, additional geofences are possible.

To increase the likelihood of a location transmission given movement, in embodiments of the invention, the remaining available processes implement static geofences. A static geofence is not dynamically generated given a new location as previously described. Rather, a static geofence is one that is fixed and represents those locations that are likely to be crossed by a given user. That is, users are habitual and frequent a limited set of locations often, for example but not limited to, their home, office, or favorite wine or sushi bar. By learning the frequent locations of users both individually and system wide and setting static geofences at these locations, biasing by the individual user, the probability of a location transmission is increased since additional geofences are likely crossed.

More so, these repeated locations vary by city, county, state, country, etc., as well as by other factors such as but not limited to day and time. Geographical and temporal presence can thus be used to vary the set of static geofences for a given user. For example, the set of static geofences for a given user will vary if the user is in Washington, D.C. rather than in San Francisco, Calif. Similarly, the set of static geofences for a given user will vary depending on the day and time. For example, a user frequents work on weekday mornings but frequents their favorite bagel shop on Sunday mornings and their favorite sushi bar on Thursday evenings.

Location transmissions suffer from a margin of error. Thus, it is difficult to precisely pinpoint and tag a location with a single transmission. Embodiments of this invention include automatic refining of a location of a user destination as a function of user routines, such as established by several user visits to the destination. As time progresses however, and a user frequents the same location multiple times, multiple location transmissions for the same location are recorded. In one embodiment of this invention, as representatively shown in FIG. 10, by overlapping the transmitted location along with its margin of error, a more accurate location can be derived. The overlapping of location transmissions for a given location 70 between streets 72 and within geofence 74, along with their margin of errors, represented as circles 76, yields an accurate location placement.

Figure 10:
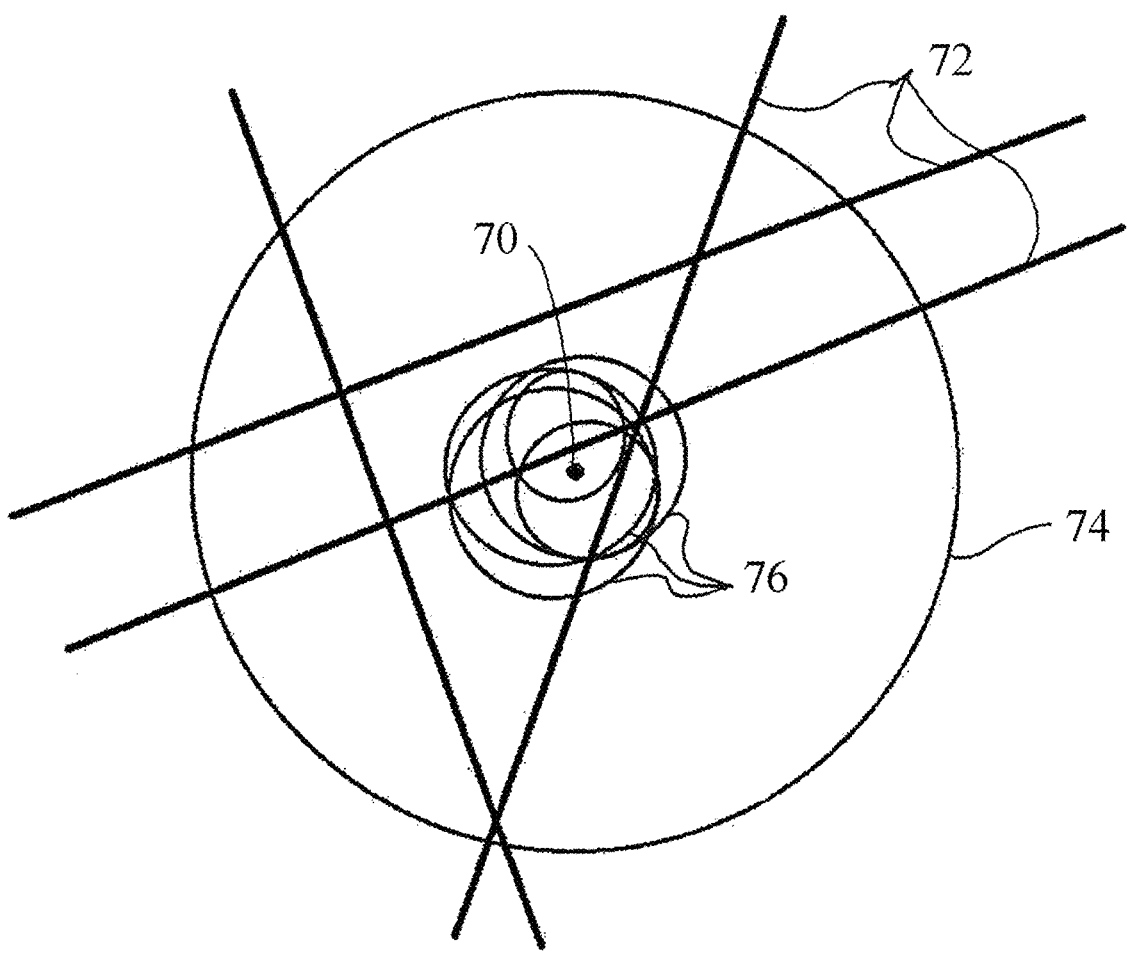
FIG. 10 illustrates the determination of a location via intersecting circles according to one embodiment of this invention.

As shown in FIG. 10, location accuracy improves as related data are collected. Related data, however, can, at times, be somewhat erroneous (in terms of accuracy). A non-limiting example is an entrance to a shopping mall. Such an entrance is not necessarily at the center of the complex. Regardless of the entrance displacement from the center of the complex, the entrance location can still be used to increase location accuracy of the mall complex since the readings for the entrance are consistent. That is, for a given user, given mobile device, given carrier, etc., such location recordings remain consistent, all be it, slightly erroneous. Thus, even dirty, namely potentially inaccurate, data can result in correct location identification.

Additionally, having established a location, corresponding lat-long pair coordinates can be reversed engineered, namely mapped back onto, a place name. These derived lat-long pair coordinates become yet an additional information component that is used by a learning system to better refine a mapping to a named place. Machine learning, data mining, and statistical approaches that are supervised, semi-supervised, or unsupervised can be used, as known in the art, to cross-correlate all available location related data.

Once determined, the user information including the location and/or any determined user activities are automatically stored in a database. Embodiments of this invention include a computer server for providing and implementing the tracking and/or social networking service of this invention. The computer server includes a location module to determine the user location and/or can optionally include a tagging module configured to correlate manually entered user information to a user destination and a database module configured to store user information including user locations and user activities at the user locations. For social media sharing, the server further desirably includes a communication module configured to automatically share a user activity in the social networking service upon further user arrivals at a corresponding one of the user or community locations. The server can also include an association module configured to associate the user activity with the corresponding user location.

Since location transmissions are needed during movement, the obvious question arises: when should the transmissions cease? That is, the system must determine when the user has arrived at a location to know when to perform the automatic steps discussed above. As discussed above, GPS systems are an energy drain on a mobile device, particularly as the GPS remains on and linked with the satellites to maintain location detection. Keeping a GPS application operating is a drain on both the processor and the battery of the mobile device. This invention includes a method and executable application that conserves energy by not continually running during use of the mobile device.

Embodiments of this invention provide an automated method of tracking a mobile user that includes providing a location module configured to receive location transmissions, placing the location module into a sleep mode, awakening the location module upon receipt of a location transmission, and determining a location with the location module. These placing, awakening, and determining steps are repeated, thereby placing the application into a sleep mode when not needed, thereby reducing the drain on the mobile device. The application goes into sleep mode when necessary or when desired, such as when the application is not needed, e.g., during extended movement or upon an arrival at a location. In embodiments of this invention, the application can go into sleep mode whenever a time since the device awakening exceeds a predetermined time allocation, or upon a determined rate of travel exceeding a predetermined threshold, thereby indicating extended travel.

Figure 11:
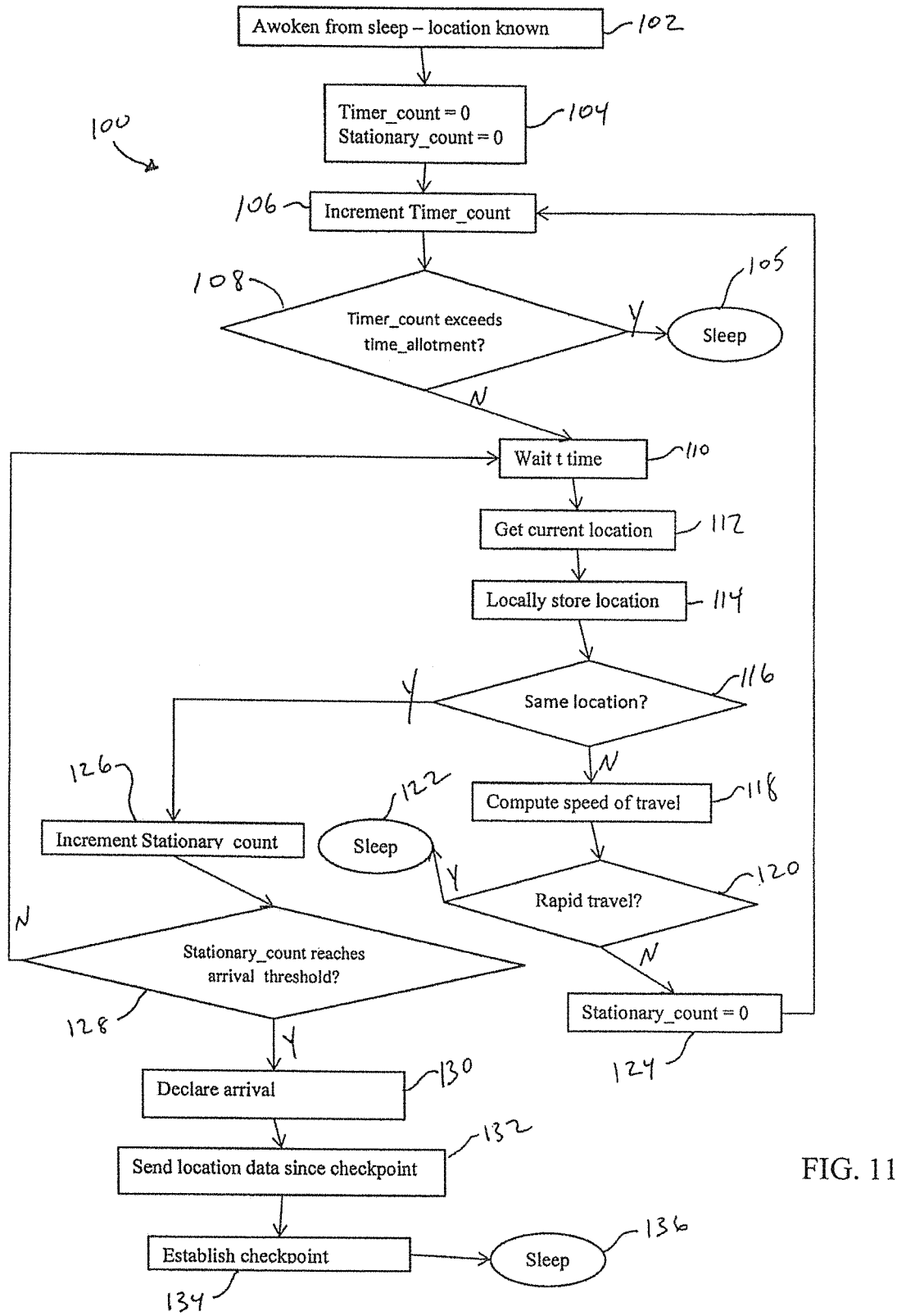
FIG. 11 illustrates the processing flow employed to identify an arrival according to one embodiment of this invention.

FIG. 11 illustrates one exemplary, and non-limiting, method according to an embodiment of this invention to automatically detect arrival at a destination. The method is useful for tracking a user's location for any of various reasons, including, for example, for safety, to provide automated reminders, and/or to provide automated suggestions to the user based upon the destination and/or surrounding area. The method of FIG. 11 is particularly useful for implementing the method and system discussed above, and can be used to implement other applications and method to provide energy savings compared to GPS location methods in mobile devices.

FIG. 11 includes a flow chart 100 that includes and/or represents three distinct situations, namely, an actual arrival, rapid movement, and sporadic movement without an actual arrival. Initially, the application is in sleep mode. Sleep mode is a state when no processing, and hence no energy consumption, takes place. Processing occurs once the application is awoken. A location transmission, such as a cell tower transmission or another application obtaining location information, awakens the application in step 102. Since the application awakening occurs due to a location transmission, the current location is known.

Once awakened, the application typically has a maximum amount of time to complete its processing. This limit, called time allotment, is set by the device operating system. All processing must complete prior to exceeding the time allotment. Ideally, the application should relinquish the processing flag back to the device operating system before the operating system forcefully removes the application from its active queue. Voluntarily terminating an application, namely returning it to the sleep mode, rather than having it forcefully terminated by the host operating system, is consider good citizenship. In step 104, the application initializes two timers, namely, a timer count representing the duration of time the process has executed since last awakening, and a stationary count representing the duration of time since the last detected device movement.

As time progresses and the process executes, the timer count is incremented in step 106. In one embodiment of this invention, whenever the application processing time exceeds the operating system time allocation (108—YES branch), the application is voluntarily placed in sleep mode 105. Note that the time allocation threshold is not necessary, but set to support good citizenship.

Assuming that the time limit has not been reached (108—NO branch), the application waits for t time units in step 110. After waiting t time units, new current location data are obtained is step 112 and stored locally on the device in step 114. In step 116, the current location is compared to the previously known location. If the two locations differ (116—NO branch), the rate of travel is computed in 118. If the rate of travel exceeds a threshold (120—YES branch), the process is desirably and voluntarily placed in sleep mode 122. Rapid travel is unlikely to result in an immediate or near term arrival; thus, checking locations while moving rapidly unnecessarily uses device energy. Eventually, the application process is awoken with the device moving at a slower rate. At that time, location checking is needed as an arrival might soon occur. If or when the rate of travel is slow (120—NO branch), movement is noted in step 124, and the loop is repeated commencing with the indication that additional processing time has elapsed in step 106.

Thus far, the arrival detection process has been voluntarily placed in sleep mode either due to having exceeded the self-imposed processing allotment quota which is desirably set just slightly below the operating system's time limit that leads to the removal of the application from the active queue (108—YES branch) or having traveled too rapidly (120—YES branch). Slow travel has resulted in simply recording the locations traveled, noting the movement exists in step 124, and awaiting either arrival or process termination.

Arrival is determined when the same location is detected for a sufficient duration of time. That is, an arrival is potentially determined when the location remains the same (116—YES branch). The stationary detection count is then incremented in step 126. If the stationary threshold is not yet exceeded (128—NO branch), the application waits for t time units in step 110, and the current location is obtained in step 112 and stored locally in step 114. A sufficient and predetermined duration at the same location eventually surpass the arrival detection threshold (128—YES Branch).

Once arrival is determined, arrival is declared in step 130, and all data regarding the prior locations visited and stored locally are compressed and sent to the back end system supporting the application in step 132. A new location checkpoint is established in step 134, and the process is placed in sleep mode 136. From the sleep modes, the process of FIG. 11 repeats upon a known location.

Compression of location data is typically performed prior to local device to back-end system transmission as often the location data many not be needed at the back end. Location data may not be needed in cases, for example but not limited, during rapid travel. Although exemplified as having data compression occur prior to the sending of the data to the back-end, it is within the scope of this invention to compress location data prior to storing them locally.

All parameters described above for FIG. 11, for example t (for the time units), timer count, etc., are system and device dependent. Experimentation with and fine tuning of these and other parameters is within the scope of this invention. Also within the scope of this invention is the tuning of these and other parameters via the use of machine learning, data mining, and statistical approaches; supervised, semi-supervised, and unsupervised approaches can be used.

As discussed above, once the user has arrived at a destination, the location identification and/or any proximate third party members of the user's community are determined, if not already known. In this way, the devices automatically continually determine locations which can be used to identify any establishments and/or any community members at or within proximity to the location.

Electronic reminder messages according to this invention provide multiple business opportunities. Frequent request postings, for example, can be used to improve service and provide better customer satisfaction. For example, consider a user with severe dietary restrictions. Such a user can post her/his restrictions as a repeated or continual electronic reminder note, i.e., one that remains active even after sending once. Upon encountering or arriving at any location classified as a dining establishment, the electronic reminder message can be automatically sent by the user and delivered to the dining establishment, and the dietary restriction information can then be maintained and accommodated. This restriction information can be permanently stored by the dining establishment or repeatedly resent by the user upon each arrival.

Similarly, other desirable preferences can be sent via an electronic reminder message. For example, but not limited to, a frequent sushi eater might have her/his favorite sushi preferences recorded; similarly, a coffee enthusiast might record her/his favorite coffee type and style of serving.

Regardless of the user motivation, be it restrictions or preference, or the type of electronic reminder message used, such notification can be encouraged and potentially rewarded by the retail establishment. Such information can potentially assist, for example, the dining establishment to provide a better customer experience, hence, a higher probability of generating a returning customer visit.

Another business opportunity exists in the data mining of electronic reminder messages. Pattern detection of favorite food orders or favorite wine selections can help in inventory control and special offerings as well as with marketing strategies. For example, if sea urchin is often requested by the very often visiting, frequent repeat diners as posted on their electronic reminder messages then a dining establishment would be wise to carry a larger supply of sea urchin than would normally be expected. Carrying a larger amount and potentially a variety of sea urchin would be financially logical in such cases, although, overall, sea urchin might not be that frequently purchased on a global scale.

Yet an additional business opportunity is the enticement of community members of a user to visit an establishment frequented by the user. Such enticement can be accomplished as follows. Consider a rewards program established in a location a user dines frequently. Whenever, or periodically when, the user frequents this establishment, s/he is rewarded via a gift of some sort, say, without loss of generality, free coffee, drinks, or food. Such frequency can be determined either via the registering of electronic messages or the use of an MPSM.

By maintaining electronic messages collected by community members of a particular user which were sent by the user, whenever such a community member frequents the dining establishment, they too can be awarded a gift, again, without loss of generality, say free coffee, drinks, or food. In fact, when awarded, optionally, the dining establishment can notify the community member that s/he is awarded this gift due to the generosity of the original user—creating good community spirit. Such community awareness potentially increases the likelihood that the community member will repeat visit the establishment. Generally speaking, the likelihood that a community member will repeat visit an establishment is increased if a trusted friend frequents that same establishment. Succinctly, the user becomes an ambassador for the establishment to their community. The establishment, in turn, can be charged as a service on either a fixed charge per duration or on a pay per use basis for being informed of the visit of a community member.

Yet another additional business opportunity exists in the marketing of electronic reminder messages. Electronic reminder messages can be viewed as a form of a personalized greeting card or similarly can be viewed as an electronic business card. Opportunities exist to market customized or beautified greeting or business electronic reminder messages in a similar manner as are current business and greetings cards. That is, customized electronic reminder messages can be sold, for example, as one time purchases that provide either an unlimited or a limited number of uses or on a pay per use basis.

Thus, the invention provides a method and system for tracking user locations without the energy consumption of GPS systems. The invention can be implemented with social media systems for sharing reminders and messages of a user participating in a social networking service. The method is executed by a computer system, preferable through a mobile device, and includes automatically determining a user location, and optionally receiving user information about the location, and automatically delivering messages corresponding to the location, either the physical location or within a proximity to another person.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A method of tracking mobile users to deliver location specific messages, the method executed by a computer system and comprising:
   receiving an electronic message from a user through an electronic device, the electronic device including a location application configured to receive location transmissions;
   storing the electronic message;
   automatically receiving location information through the location application as the electronic device travels to locations;
   automatically placing the location application into a sleep mode between the locations;
   automatically awakening the location application upon receipt of a location transmission;
   automatically determining when the electronic device is at an actuating position; and
   automatically posting the electronic message upon determining the electronic device is at the actuating position;
   wherein the method further comprises:
      receiving with the location application a first location transmission for a first one of the locations;
      incrementing a timer count configured to monitor a duration of time, wherein whenever a time exceeds a predetermined time allocation, the location application is placed into the sleep mode;
      incrementing a stationary counter configured to monitor a duration of time since a previous detected movement of the mobile user;
      receiving a second location transmission of a second one of the locations;
      comparing the second one of the locations to the first one of the locations;
      calculating a rate of travel when the second one of the locations differs from the first one of the locations, wherein if the rate of travel exceeds a predetermined threshold the location application is placed into the sleep mode;
      receiving a third location transmission of a third one of the locations;
      comparing the third one of the location to at least one of the first one of the locations or the second one of the locations;
      further incrementing the stationary counter when the second or third one of the locations is the same as the first one of the locations;
      determining an arrival event upon reaching a predetermined arrival threshold of the stationary counter;
      storing data of the locations; and
      placing the location application into the sleep mode.

2. The method of claim 1, wherein the location application goes into the sleep mode upon a determined arrival at a location, whenever a time since the awakening exceeds a predetermined time allocation, and during extended travel upon a determined rate of travel exceeding a predetermined threshold.

3. The method of claim 1, wherein the actuating position comprises a proximity to a location or to a second electronic device.

4. The method of claim 1, wherein automatically posting the electronic message comprises delivering the electronic message by short message service, e-mail, and/or a common wireless connection.

5. The method of claim 1, wherein the electronic message includes an electronic message recipient selected from a predetermined social media community of the user.

6. The method of claim 5, further comprising delivering the electronic message to the electronic message recipient when the electronic device is within a proximity to the electronic message recipient.

7. The method of claim 6, further comprising automatically determining a location of the electronic device and a second electronic device of the electronic message recipient.

8. The method of claim 7, further comprising automatically repeatedly determining the location of each of the electronic device and the second electronic device.

9. A method of tracking mobile users to deliver location specific messages, the method executed by a computer system and comprising:
   automatically receiving location information through a location application of an electronic device at each of a plurality of locations as the electronic device travels to the locations;
   automatically placing the location application into a sleep mode between the locations, wherein the location application goes into the sleep mode: after automatically determining location information, and during extended travel upon an automatically determined rate of travel exceeding a predetermined threshold;
   automatically awakening the location application at each of the locations upon receipt of a location transmission;
   receiving an electronic message from a user through the electronic device;
   automatically storing the electronic message for posting at a future visit to an actuating position, wherein the actuating position is a corresponding one of the locations relevant to the electronic message;
   automatically determining with the location application and the location information when the electronic device is at the actuating position; and
   automatically posting the electronic message upon determining the electronic device is at the actuating position;
   wherein the user is a member of a social media community including a plurality of mobile users, and the locations comprise a plurality of different location identifications from the plurality of mobile users, the method further comprising ranking the different location identifications based on context, user bias, community bias, or combinations thereof.

10. The method of claim 9, wherein the location application further goes into the sleep mode whenever a time since the awakening exceeds a predetermined time allocation.

11. A method of tracking mobile users to deliver location specific messages, the method executed by a computer system and comprising:
  automatically receiving location information through a location application of an electronic device at each of a plurality of locations as the electronic device travels to the locations;
  automatically placing the location application into a sleep mode between the locations, wherein the location application goes into the sleep mode: after automatically determining location information, and during extended travel upon an automatically determined rate of travel exceeding a predetermined threshold;
  automatically awakening the location application at each of the locations upon receipt of a location transmission;
  receiving an electronic message from a user through the electronic device;
  automatically storing the electronic message for posting at a future visit to an actuating position, wherein the actuating position is a corresponding one of the locations relevant to the electronic message;
  automatically determining with the location application and the location information when the electronic device is at the actuating position; and
  automatically posting the electronic message upon determining the electronic device is at the actuating position;
  wherein the location application further goes into the sleep mode whenever a time since the awakening exceeds a predetermined time allocation and the location application comprises:
  a timer counter configured to monitor a duration of time since each awakening, wherein whenever a time since the awakening exceeds a predetermined time allocation, the location application is placed into a sleep mode; or
  a stationary counter configured to monitor a duration of time since a previous detected movement of the mobile user.

12. The method of claim 9, wherein the actuating position comprises a proximity to a location or to a second electronic device.

13. The method of claim 9, wherein automatically posting the electronic message comprises delivering the electronic message by short message service, e-mail, and/or a common wireless connection.

14. The method of claim 9, wherein automatically posting the electronic message comprises delivering or displaying the electronic message to the user via the electronic device.

15. The method of claim 9, wherein the electronic message includes an electronic message recipient selected from a predetermined social media community of the user.

16. The method of claim 15, further comprising:
  automatically determining a location of the electronic device and a second electronic device of the electronic message recipient; and
  automatically delivering the electronic message to the electronic message recipient when the electronic device is within a proximity to the electronic message recipient.

17. The method of claim 11, wherein the user is a member of a social media community including a plurality of mobile users, and the locations comprise a plurality of different location identifications from the plurality of mobile users, the method further comprising ranking the different location identifications based on context, user bias, community bias, or combinations thereof.

18. The method of claim 9, further comprising increasing the accuracy of the location information by overlapping a plurality of locations transmissions from different mobile user visits to the locations.

19. A method of tracking mobile users to deliver location specific messages, the method executed by a computer system and comprising:
  automatically receiving location information through a location application of an electronic device at each of a plurality of locations as the electronic device travels to the locations;
  automatically placing the location application into a sleep mode between the locations, wherein the location application goes into the sleep mode: after automatically determining location information, and during extended travel upon an automatically determined rate of travel exceeding a predetermined threshold;
  automatically awakening the location application at each of the locations upon receipt of a location transmission;
  receiving an electronic message from a user through the electronic device;
  automatically storing the electronic message for posting at a future visit to an actuating position, wherein the actuating position is a corresponding one of the locations relevant to the electronic message;
  automatically determining with the location application and the location information when the electronic device is at the actuating position;
  automatically posting the electronic message upon determining the electronic device is at the actuating position; and
  automatically determining a user activity at each of the locations and automatically sharing the associated user activity in a social networking service upon future user arrivals at the location as a function of automatically comparing learned context information to a future context of each of the future user arrivals, without receiving any manually entered confirmation or manually entered additional user information, wherein each of the learned context and the future context comprises at least one of: a time of day, a day of a week, a calendar date, a preceding user activity to the user visits, a weather condition, people accompanying the user, or community member activity bias information for the destination.

20. The method of claim 19, wherein the electronic message includes an electronic message recipient selected from the social networking service, and further comprising:
  automatically determining a location of the electronic device and a second electronic device of the electronic message recipient; and
  automatically delivering the electronic message to the electronic message recipient when the electronic device is within a proximity to the electronic message recipient.

* * * * *